(12) United States Patent
Smith et al.

(10) Patent No.: US 12,431,701 B2
(45) Date of Patent: Sep. 30, 2025

(54) DROPOUT RECLOSER

(71) Applicant: S&C Electric Company, Chicago, IL (US)

(72) Inventors: Richard G. Smith, North Aurora, IL (US); Yujian Zhou, Chicago, IL (US); Jorge Montante, Chicago, IL (US); Alejandro Montenegro, Chicago, IL (US); Michael Ross, Chicago, IL (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 18/425,776

(22) Filed: Jan. 29, 2024

(65) Prior Publication Data

US 2024/0170946 A1 May 23, 2024

Related U.S. Application Data

(63) Continuation of application No. 17/708,942, filed on Mar. 30, 2022, now Pat. No. 11,916,369, which is a
(Continued)

(51) Int. Cl.
*H02H 3/20* (2006.01)
*H01H 1/00* (2006.01)
(Continued)

(52) U.S. Cl.
CPC ............ *H02H 3/20* (2013.01); *H01H 1/0015* (2013.01); *H01H 9/0038* (2013.01);
(Continued)

(58) Field of Classification Search
CPC ............ B60L 3/0046; B60L 3/04; H02H 7/18
See application file for complete search history.

(56) References Cited

U.S. PATENT DOCUMENTS 3,646,294 A * 2/1972 McCloud ........... H01H 33/6661
218/20
4,935,715 A * 6/1990 Popeck ................ H01H 71/123
361/115

(Continued)

FOREIGN PATENT DOCUMENTS

| EP | 0676788 A2 * | 10/1995 | ............ H01H 85/43 |
|---|---|---|---|
| KR | 20150006058 A * | 1/2015 | ............... H02H 3/20 |
| WO | WO-2013169716 A1 * | 11/2013 | ........... H01H 9/0038 |

OTHER PUBLICATIONS

Scgerer, Henry; Fuse assembly with low exhaust and replaceable cartridge; entire specification with drawings; (Year: 1995).*

*Primary Examiner* — Dharti H Patel

(57) ABSTRACT

A dropout recloser is capable of in accordance with its operating programming after a predetermined number of fault interrupting operations, e.g., 1, 2, 3 or more but typically 3, to drop out of a cutout and hang freely in a hinge contact of the cutout providing sectionalization with an observable visible gap. The recloser includes fault interrupting and reclosing components, a drop out mechanism and a controller. The drop out mechanism may include a bi-stable actuator to affect fault interrupting operation and dropout operation. The device may include motion limiting structures. The recloser may have a number of operating modes or sequences.

14 Claims, 11 Drawing Sheets

Related U.S. Application Data continuation of application No. 16/866,656, filed on May 5, 2020, now Pat. No. 11,322,927, which is a continuation of application No. 14/399,534, filed as application No. PCT/US2013/039857 on May 7, 2013, now Pat. No. 10,727,662.

(60) Provisional application No. 61/643,593, filed on May 7, 2012.

(51) Int. Cl.

| | | |
|---|---|---|
| *H01H 9/00* | (2006.01) | |
| *H01H 33/00* | (2006.01) | |
| *H01H 33/66* | (2006.01) | |
| *H01H 33/666* | (2006.01) | |
| *H01H 50/54* | (2006.01) | |
| *H01H 75/04* | (2006.01) | |

(52) U.S. Cl.
CPC ........ *H01H 33/66* (2013.01); *H01H 33/6662* (2013.01); *H01H 50/54* (2013.01); *H01H 75/04* (2013.01); *H01H 33/008* (2013.01)

(56) References Cited

U.S. PATENT DOCUMENTS

| | | | | |
|---|---|---|---|---|
| 5,162,967 | A * | 11/1992 | Ojanguren Torrontegui | H01H 73/36 337/171 |
| 5,172,090 | A * | 12/1992 | Ranjan | H02H 3/063 337/174 |
| 5,612,661 | A * | 3/1997 | Twenter | H01H 31/28 337/171 |
| 8,334,738 | B2 * | 12/2012 | Smith | H01H 75/04 361/72 |
| 2004/0144756 | A1 * | 7/2004 | Rhein | H01H 33/6662 218/120 |
| 2005/0104709 | A1 * | 5/2005 | Montante | H01H 31/127 337/171 |
| 2009/0212898 | A1 * | 8/2009 | Montante | H01H 31/02 337/171 |
| 2015/0116878 | A1 * | 4/2015 | Richard | H01H 1/0015 335/196 |

* cited by examiner

# DROPOUT RECLOSER

CROSS-REFERENCE RELATED TO APPLICATIONS

This application is continuation of prior U.S. application Ser. No. 17/708,942, filed Mar. 30, 2022, which is continuation of U.S. Pat. No. 11,322,927 issue on May 3, 2022, which is also continuation of U.S. Pat. No. 10,727,662 issued on Jul. 28, 2020, which is a national stage entry of International Application Number PCT/2013/039857, filed May 7, 2013, which claims priority of U.S. Application No. 61/643,593, filed May 7, 2012, which are all hereby incorporated herein by reference in their entirety.

TECHNICAL FIELD

This patent relates to electric transmission and distribution system fault detection, fault isolation and protection devices, sectionalizers and reclosers, and in particular, this patent relates to self-reclosing, dropout recloser devices and methods.

BACKGROUND

U.S. patent application Ser. No. 12/095,067, filed Jul. 16, 2008, the disclosure of which is hereby incorporated herein by reference and commonly assigned to the owner of this patent describes a fault interrupting and reclosing device of a self-contained design. The device conveniently fits within conventional cutouts, provides fault detection and fault interruption, reclosing/service restoration and dropout sectionalizing lock out with a visible gap. A corresponding commercial product is the dropout recloser marketed and sold by S&C Electric Company of Chicago, Illinois, United States of America under the trademark TripSaver®, which has received broad acclaim being named a winner of the 2008 R&D 100 Awards Competition and a winner of the 2007 Chicago Innovation Awards Competition as well as having commercial success.

DETAILED DESCRIPTION

Figure 1:
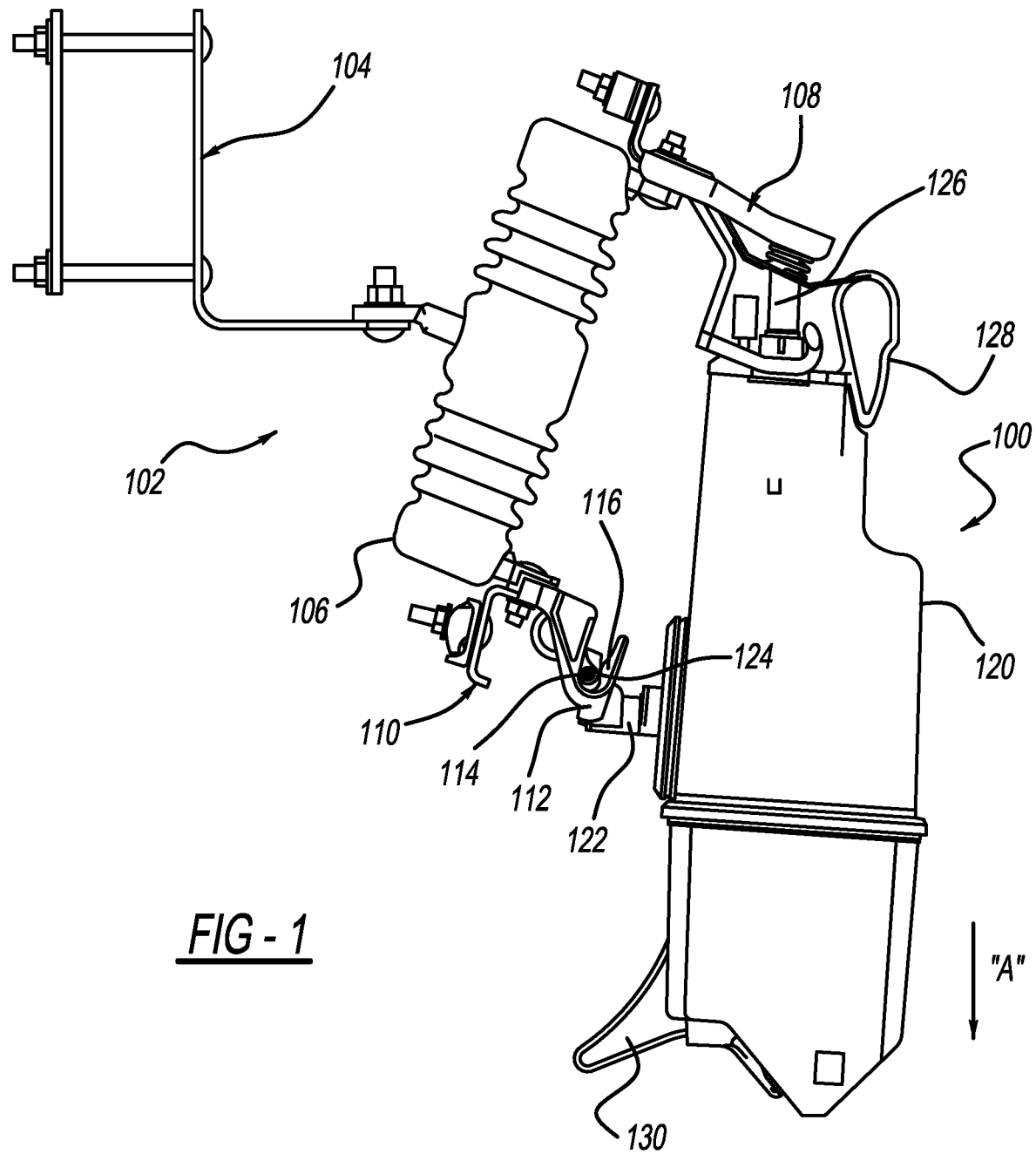
FIG. 1 is a side view of a dropout recloser according to herein described embodiments electrically coupled within a cutout.

FIG. 1 depicts a dropout recloser 100 (referred to herein either as the dropout recloser 100 or the recloser 100) coupled within a cutout 102. The cutout 102 is of conventional construction as such as the Type XS Cutout available from S&C Electric Company, Chicago, Illinois, USA. The cutout 102 includes a mounting 104, an insulator 106, first spring biased contact 108 and second hinge contact 110. The hinge contact 110 includes a hinge portion 112 formed with a pivot receiving slot 114 with an integral retaining structure 116. The cutout 102 is depicted and described to facilitate the following discussion of the structure and operation of the dropout recloser 100.

The recloser 100 includes a housing 120 for the recloser 100. The housing 120 may be a unitary structure or an assembly of housing portions. As shown the housing 120 includes first and second portions. The recloser 100 includes a trunnion or terminal 122 including a pivot 124. The trunnion 122 extends from a side portion as depicted in the drawing of the housing 120. The recloser 100 also includes a post-like contact or terminal 126 disposed at an upper portion as depicted in the drawing of the housing 120. The hinge portion 112 and in particular the pivot receiving slot 114 receives the trunnion 122 and pivot 124 and the spring-biased contact 108 engages the contact 126 to secure the recloser 100 in the cutout 102 and electrically couple the recloser 100 to the cutout 102.

Figure 2:
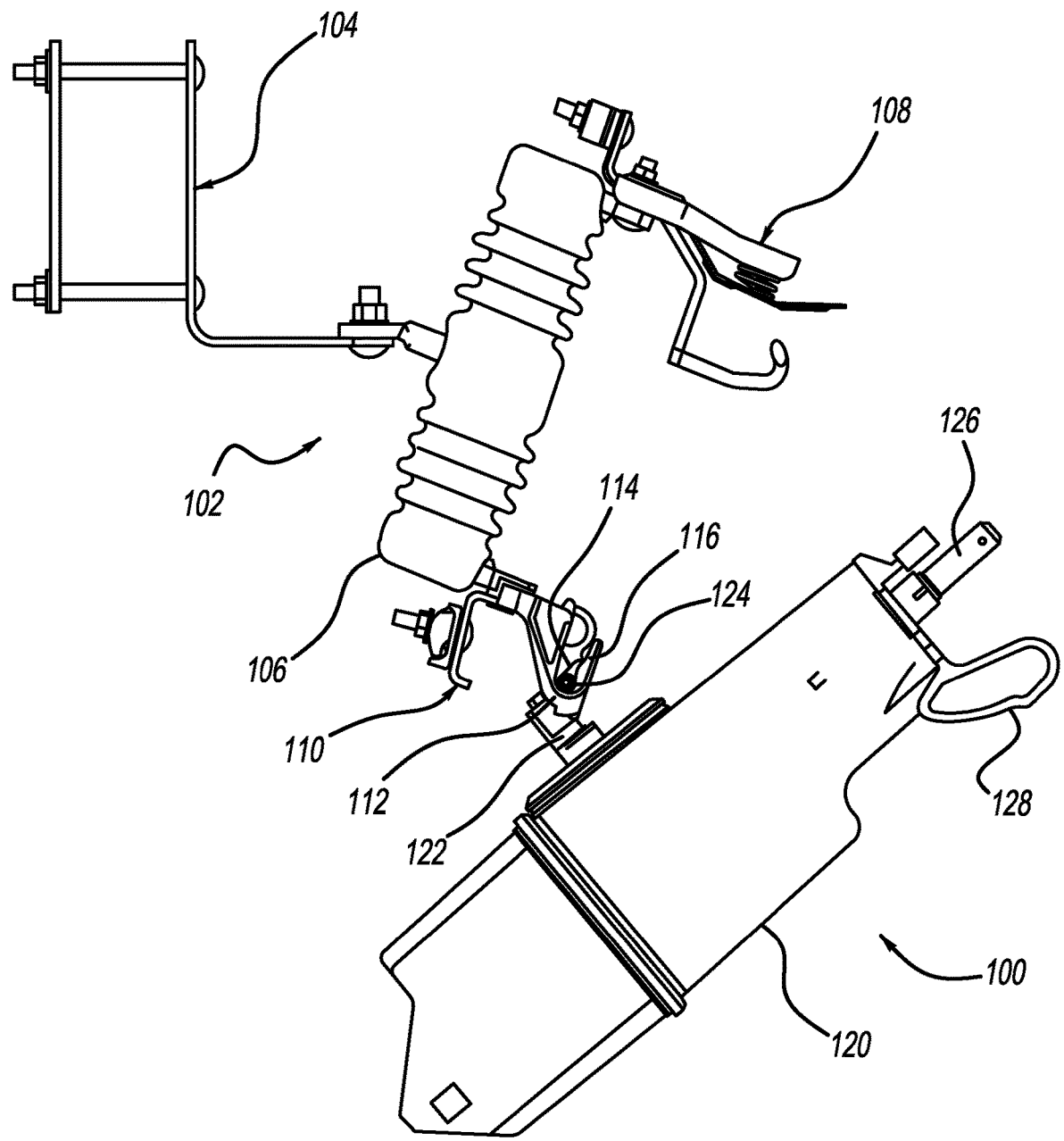
FIG. 2 is a side view of the dropout recloser shown in FIG. 1, in a dropout position.

The recloser 100 is a dropout recloser. A dropout recloser is capable of in accordance with its operating programming after a predetermined number of fault interrupting operations, e.g., 1, 2, 3 or more but typically 3, to drop out of the cutout 102 and hang freely in the hinge contact 110 providing sectionalization with an observable visible gap. As will be described, the recloser 100 includes fault interrupting and reclosing components, a drop out mechanism and a controller. The drop out mechanism coupled to the trunnion 122 allows translation and/or articulation of the entire recloser 100 relative to the trunnion 122 in the direction of arrow "A" in FIG. 1. This motion of the recloser 100 releases the contact 126 from contact 108 freeing the recloser 100 to rotate about pivot 124 in the hinge 112. FIG. 2 reflects the recloser 100 after this action of releasing the recloser 100 from the cutout 102 to a dropout position.

Figure 3:
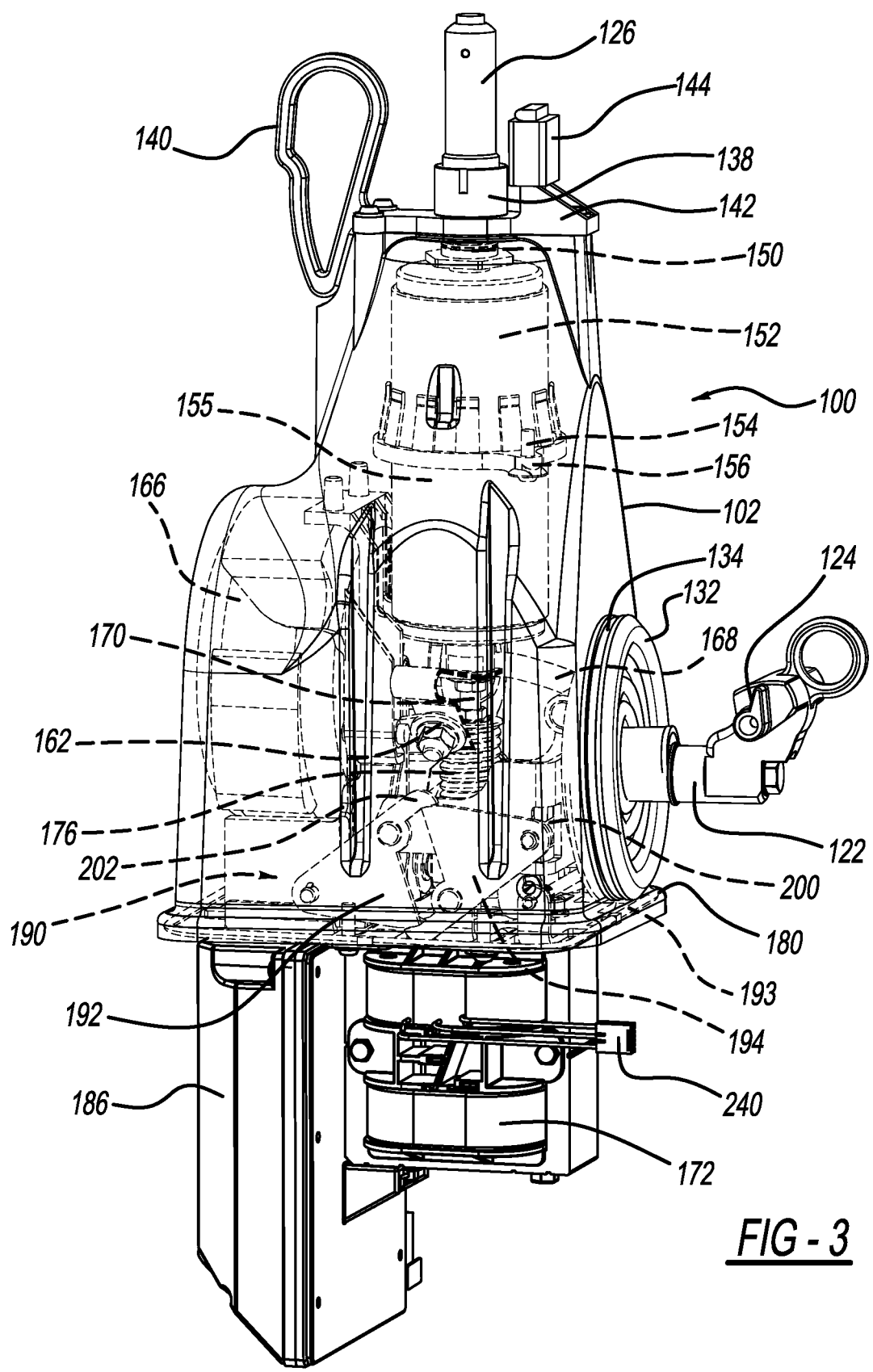
FIG. 3 is side perspective view of the dropout recloser shown in FIG. 1, the housing portion thereof being depicted in phantom to reveal components disposed therein.
Figure 4:
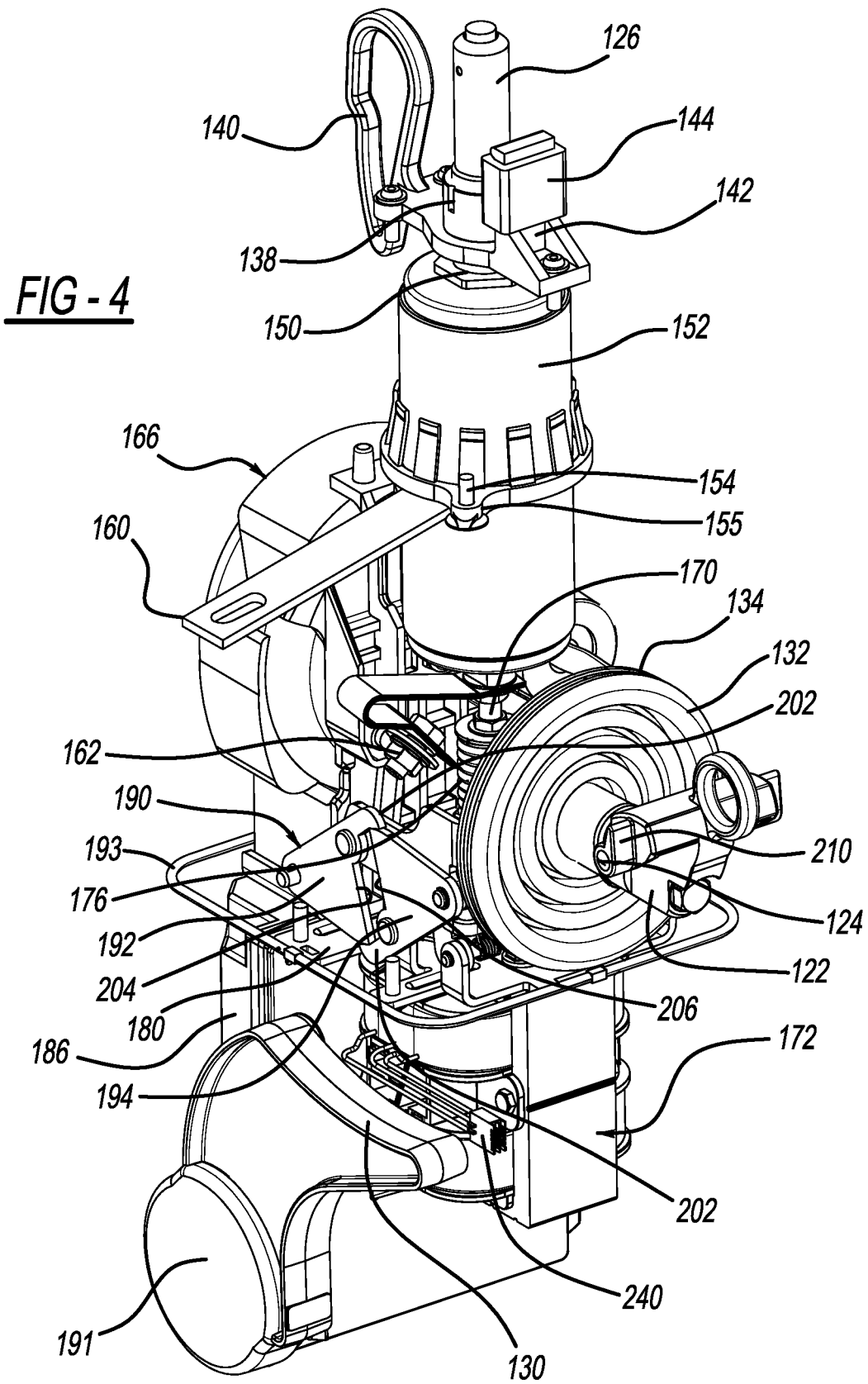
FIG. 4 is a side perspective view of the dropout recloser shown in FIG. 1 with the housing portion removed to reveal the internal components of the dropout recloser.
Figure 5:
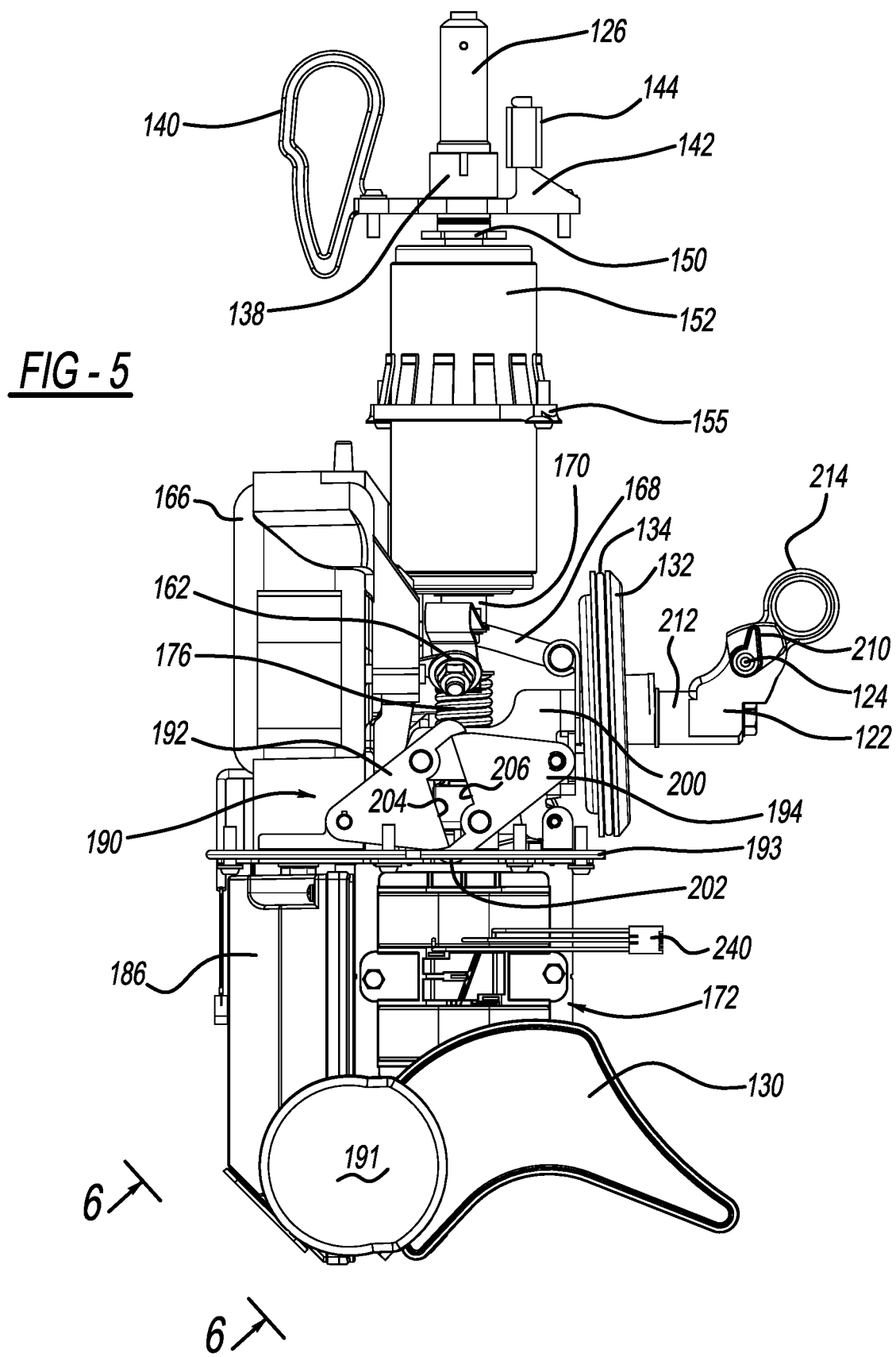
FIG. 5 is a side view of the dropout recloser shown in FIG. 1 with the housing portion removed to reveal the internal components of the dropout recloser.

FIGS. 3-5 are illustrations of the operative components of the recloser 100 internal to the housing 120. An advantage of the recloser 100 is that in addition to the fault isolation/reclosing components, the drop out mechanism except for the portion of the trunnion 122 extending outwardly from the housing 120 are contained within the housing 120. Hence, the recloser 100 enjoys excellent weather resistance.

A seal 132 and seal garter 134 provide weather-tight sealing of the housing 120 where the trunnion 122 extends through.

The contact 126 extends through a bushing 138 that is formed integrally with a D-ring handle 140 and a bump stop 142 fitted with an insulating bumper 144. Extending through the bushing 138 the contact 126 is electrically coupled to a first side 150 of a vacuum interrupter 152 secured within the housing 120 by threaded fasteners 154 engaging a vacuum interrupter guide structure 155 with boss structures 156 formed within the housing 120. In this manner, the contact 126 is coupled to a stationary contact (not depicted) of the vacuum interrupter 152. A flexible contact assembly 160 electrically couples a moving contact (not depicted) of the vacuum interrupter 152 and hence the contact 126 internally within the housing 120 to a power supply and sensing assembly 166 and via a terminal structure 162 (an intermediate flexible conductor not depicted) and from the assembly 166 via a conductor 168 to the trunnion 122.

The moving contact of the vacuum interrupter 152 is coupled to an actuating rod 170 that extends within the housing 120 to an actuator 172. A bias spring 176 engages the rod 170 and provides a bias force on the rod 170. Described later, the actuator 172 may be a dual coil, bi-stable electro-magnetic solenoid.

Figure 6:
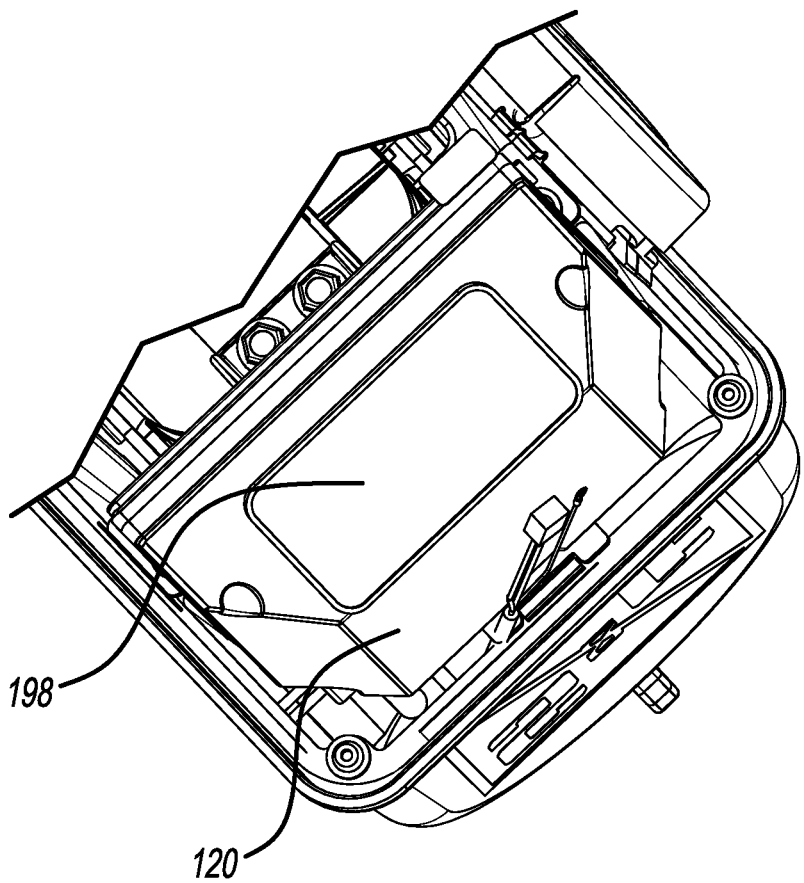
FIG. 6 is a view taken along lines 6-6 of FIG. 5 depicting a bottom housing portion of the dropout recloser and a display device disposed therein.

A main frame plate 180 secured within the housing 120 provides a foundation for secure mounting of the power supply and sensor assembly 166, the actuator 172, an electronic control module 186 and a dropout assembly 190. A seal 193 ensures weather-tight sealing of the housing 120 about the main frame plate. A magnetic control switch assembly 191 is coupled to the control module 186 and is actuated via a selector 130. The control module further couples to a display 198 (FIG. 6).

The recloser 100 is designed to manage operating voltages up to or potentially in excess of 34.5 kV, and fault currents up to or potentially in excess of 4000 A. Suitable conducting and insulating materials are therefore selected for its construction.

The dropout assembly 190 includes two mutually engaging operating members 192 and 194 mounted on pivots 196 and 198. A solenoid actuator (not depicted) engages the member 192. The member 194 couples to an articulating trunnion mount 200. The actuator drives members 192 and 194 to release tabs 202. Under the weight of the recloser 100, the members 192 and 194 rotate with the members 192 and 194 sliding along the surfaces 204 and 206. The trunnion 122 articulates responsive to its coupling to the member 194 and the recloser 100 translates relative to the cutout 102 allowing for dropout for the recloser 100 from the coupled position as depicted in FIG. 1 to the dropout configuration as depicted in FIG. 2.

To control and limit the rotating motion of the reclosure 100 during dropout, the pivots 124 may be formed with motion limiting structures 210. The structures 210 may be radially extending arms formed integral with the pivots 124.

Figure 8:
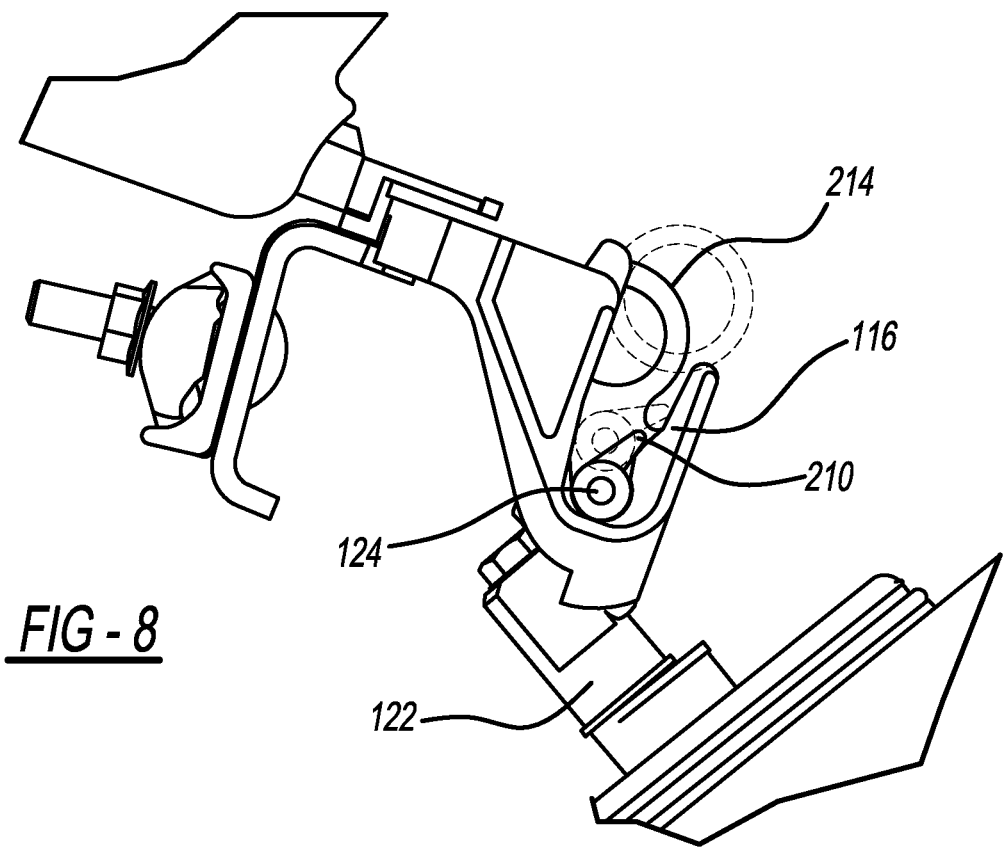
FIG. 8 is an enlarged view of the trunnion shown in FIG. 7 disposed within a lower contact assembly of a cutout.
Figure 9:
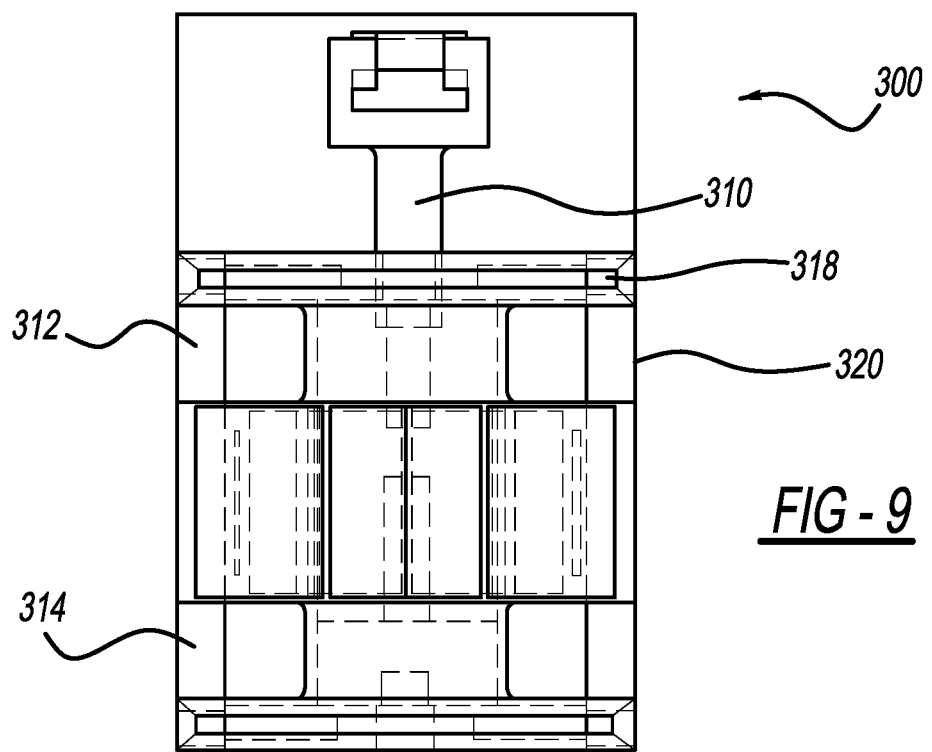
FIG. 9 is a side view of an actuator suitable for use in various devices including a dropout recloser as depicted in FIG. 1.
Figure 10:
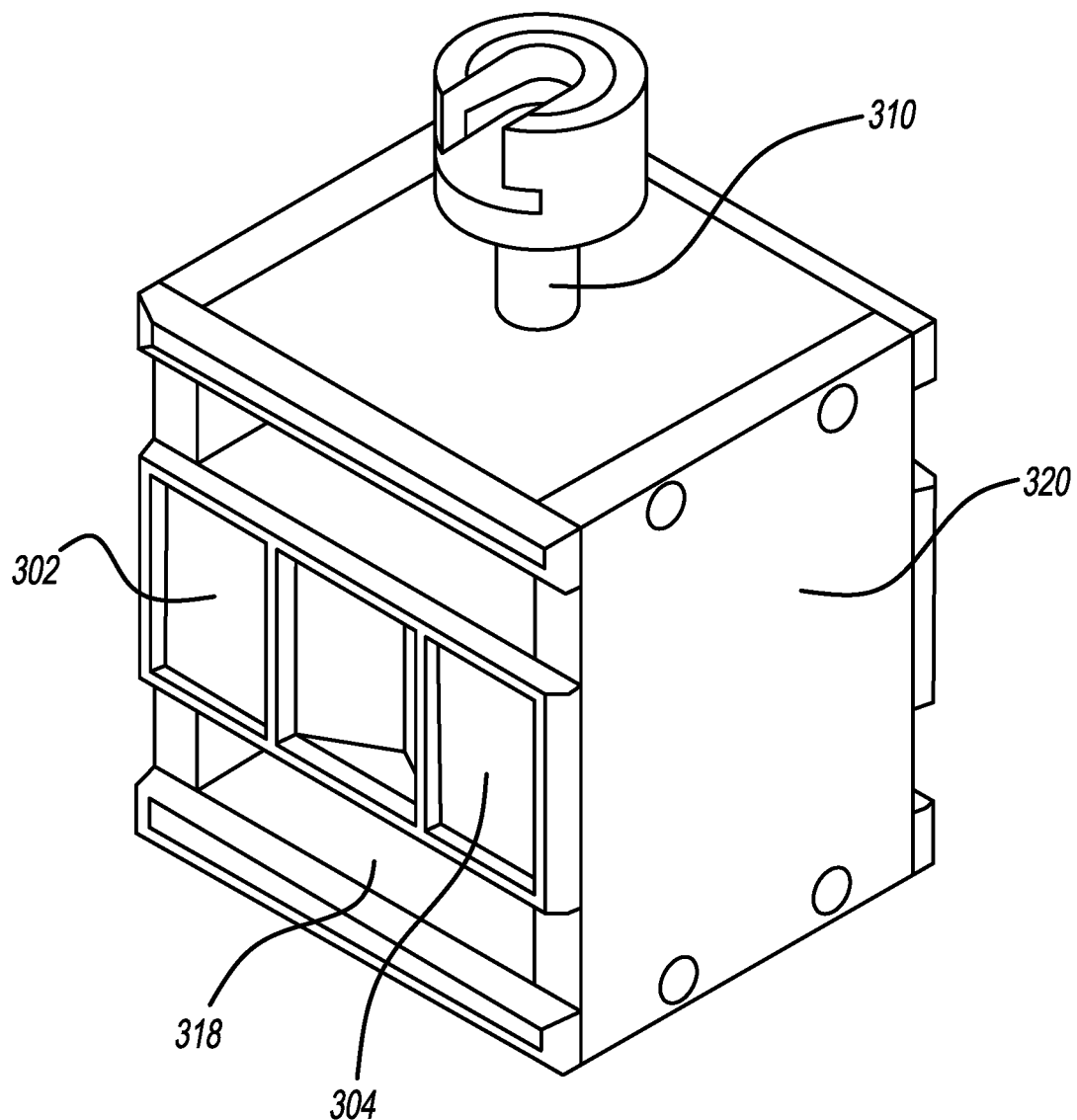
FIG. 10 is a perspective view of the actuator depicted in FIG. 9.
Figure 11:
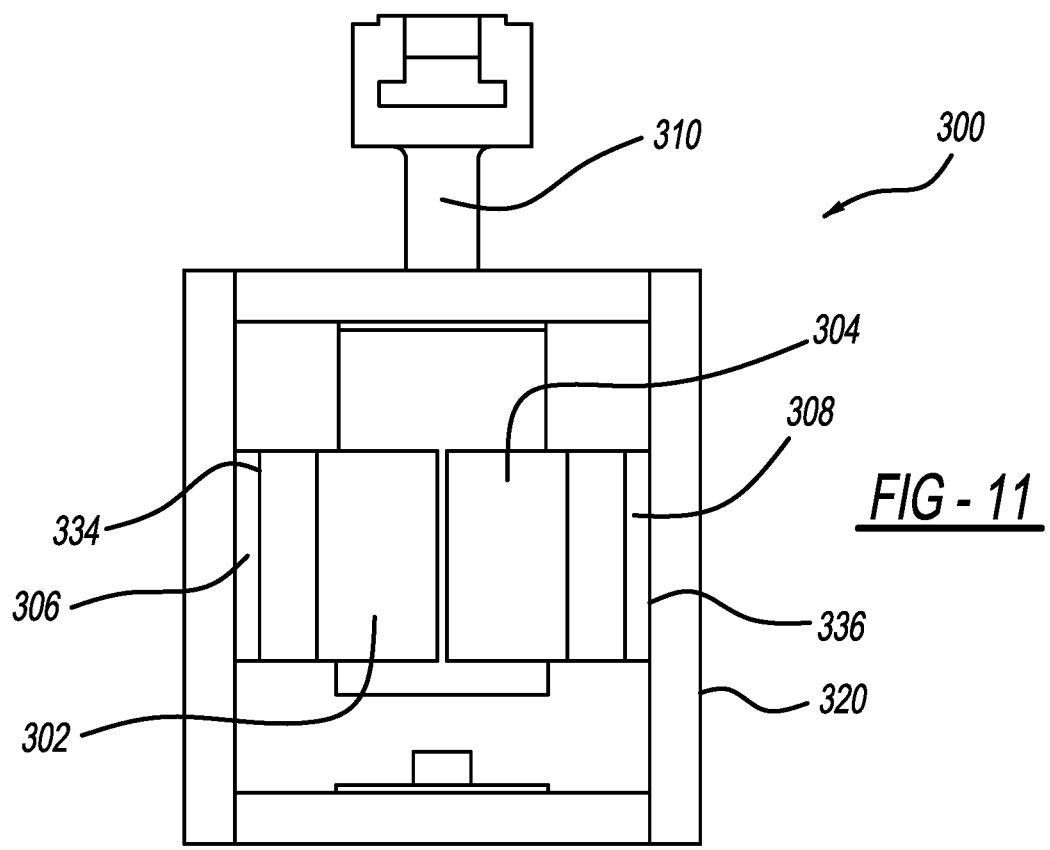
FIG. 11 is a graphic illustration of the actuator depicted in FIG. 9 in a first position.
Figure 12:
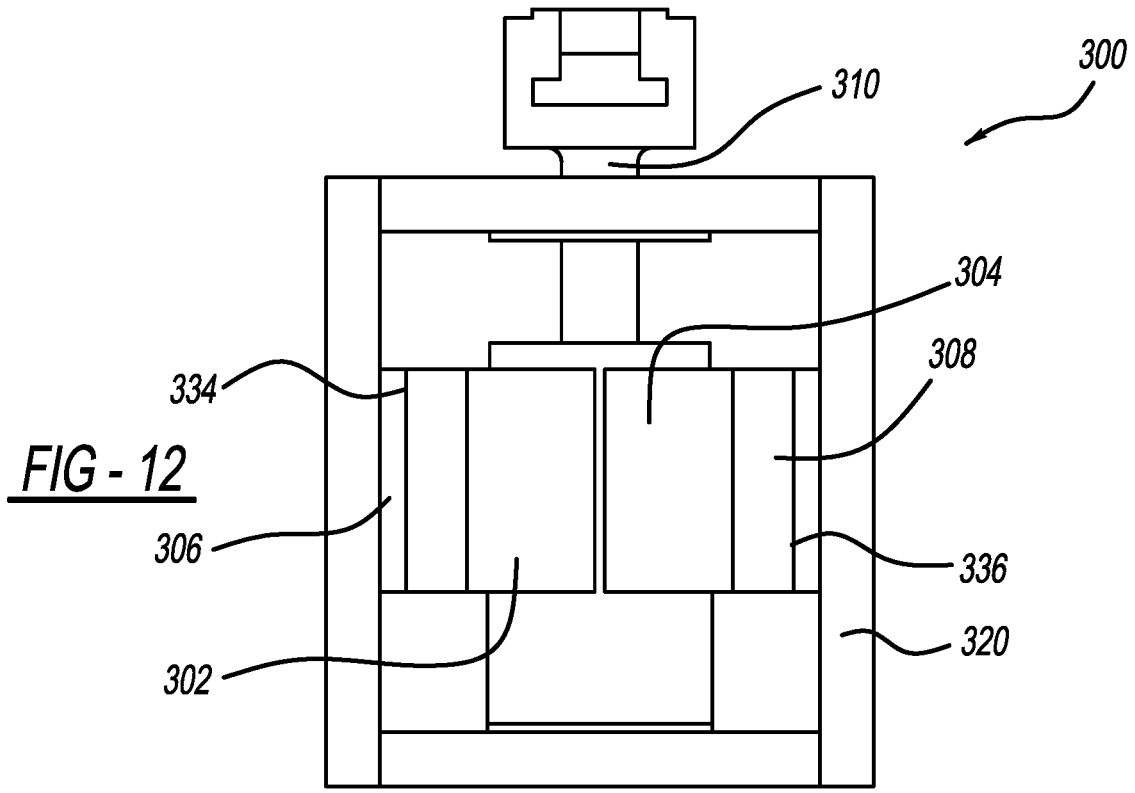
FIG. 12 is a graphic illustration of the actuator depicted in FIG. 9 in a second position different than the first position shown in FIG. 11.
Figure 13:
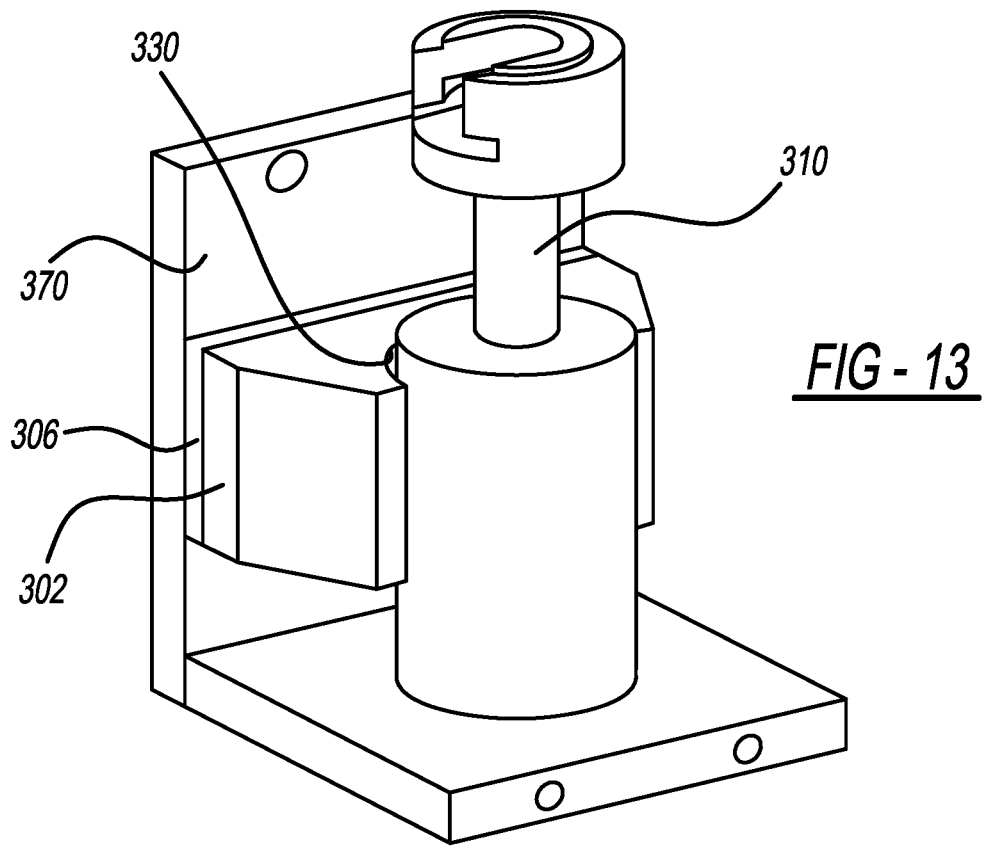
FIG. 13 is a graphic illustration of a partial perspective view of the actuator depicted in FIG. 9.
Figure 14:
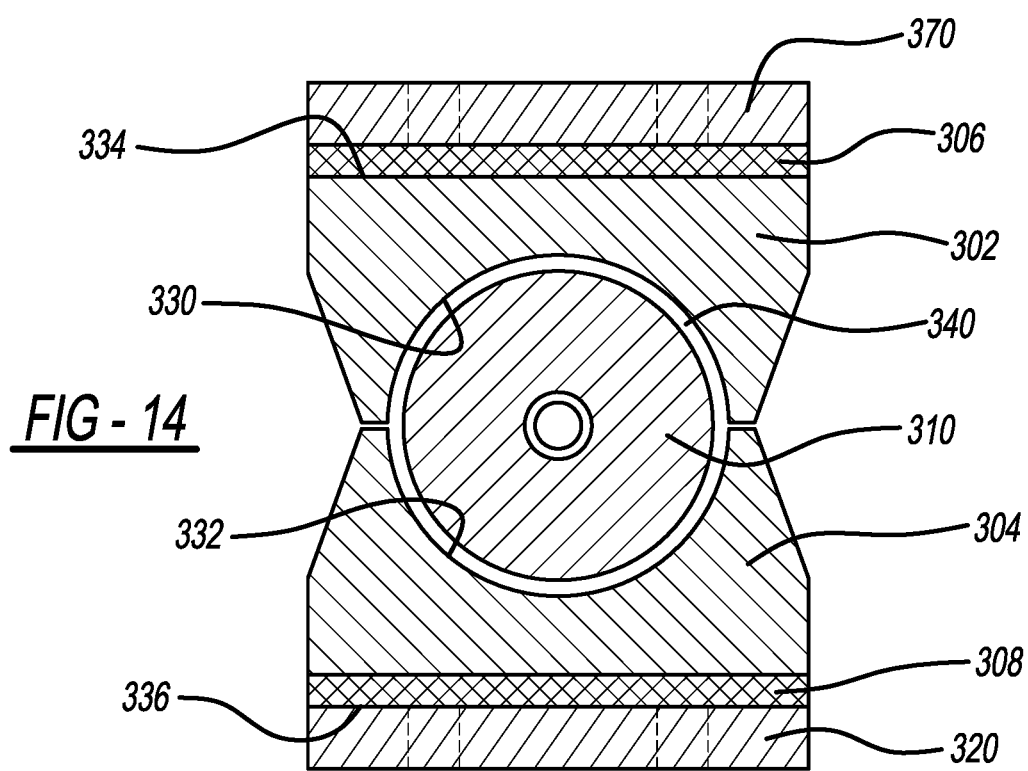
FIG. 14 is a graphic illustration of a section view of the actuator depicted in FIG. 9.

Best seen in FIG. 8, the structures 210 engage the retaining structures 116 of the hinge slots 114 limiting the arc through which the recloser 100 moves during dropout. The recloser 100 does not stop abruptly upon engagement of the structures 210 with the structures 116; however, and the recloser 100 advantageously utilizes its weight to provide slow rotation and provide damping. As the structures 210 engage the structures 116 they lever the trunnion 122 in a motion translating the trunnion 122 and hence the recloser 100 in the hinge slot 114. This motion is depicted in phantom in FIG. 8. Causing the recloser 100 to lift its own weight on dropout quickly dissipates the energy of dropout.

Figure 7:
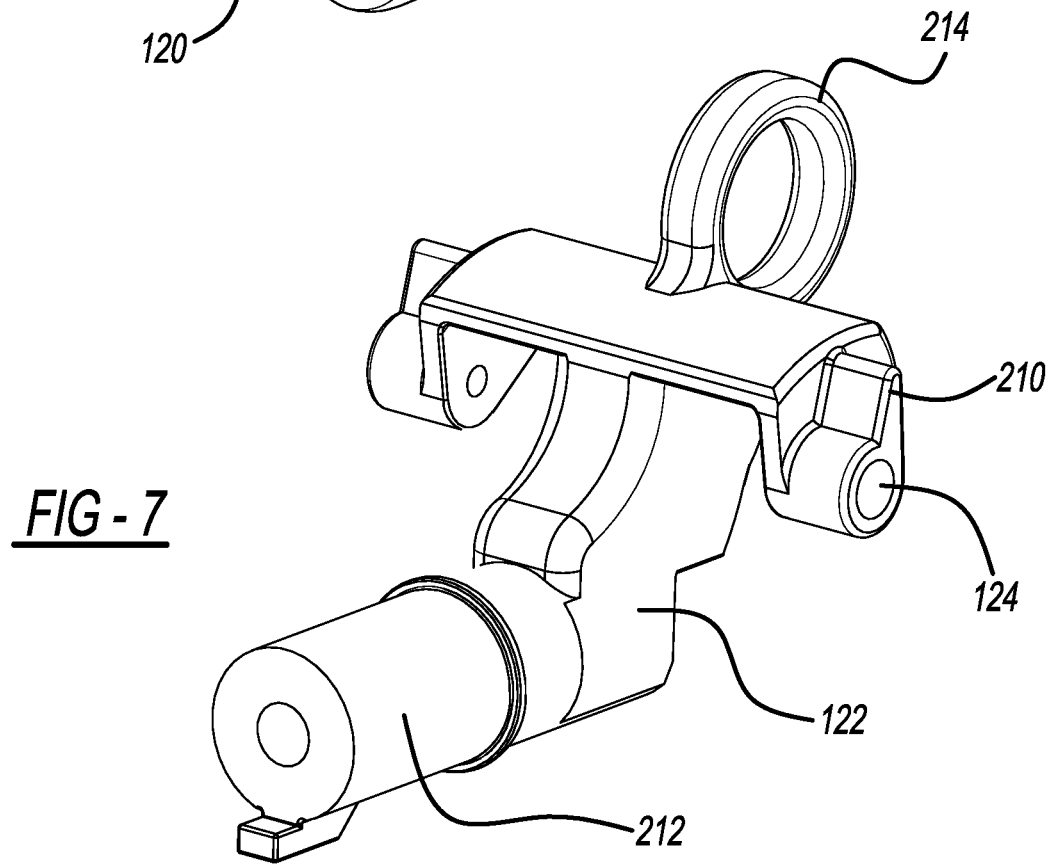
FIG. 7 is a side perspective view of a trunnion that may be used in the dropout recloser of FIG. 1.

As an alternative to the radial arms 210 depicted in FIGS. 7 and 8, pins may be fitted to the trunnion 122 or other structures that ultimately engage the a portion of the hinge slot 114 to dissipate energy of dropout and hence reduce rotational travel and oscillation.

FIG. 7 also illustrates the connecting boss structure 212 of the trunnion 122 that extends into the housing 120 and allows coupling to the dropout mechanism. A threaded fastener (FIGS. 3-5) may be used to secure the trunnion 122. The trunnion 122 may also be formed with a hook loop 214 to facilitate placement of the recloser 100 in the cutout 102 using a conventional hook stick.

The recloser 100 utilizes the actuator 172 to drive the moving contact of the vacuum interrupter 152 from a make position to a break position and vice versa. This is accomplished via exertion of axial force to the connecting rod 170. The actuator 172 may be a device having two stable states corresponding with the contact make and contact break positions of the vacuum interrupter 152, i.e., latching ability, while still providing sufficient driving force to break the contacts of the vacuum interrupter 152 under fault current conditions and to make the contacts quickly.

Actuator

The actuator 300 illustrated in FIGS. 9-15 may be used in the recloser 100. The actuator 300 is of the bi-stable-type operators, and embodies pole pieces that transmit flux to the operator from one or more flat magnets. Flat magnets are easy to manufacture and magnetize. The actuator 300 also stabilizes and locates the magnets and pole pieces within a molded cavity of a common coil bobbin without the need for glues or adhesives. Structures of bi-stable actuators and theory of operation are described in Appendix A.

As shown in the figures, actuator 300 includes two pole pieces 302 and 304 concentrating two permanent magnets 306 and 308, for example suitable permanent magnets include NdFeB magnets, around an operator/plunger 310. Two coils 312 and 316 (FIG. 9), for example suitable coils include 250 T coils, mounted on a single bobbin 318 within a frame 320 toggle the plunger 310 between stable states. The frame may be a simple structure of 4 plates of suitable metal or non-metallic structural material. The actuator 300 latches at each end of its stroke (FIGS. 11 and 12) and provides forces to toggle from one end to the other as well as to drive a load. The coils 312 and 316 toggle lines of flux from the magnets 306 and 308 from one end of the plunger 310 to the other.

The coil bobbin 318 embodies a linear bearing surface to guide, support and constrain the moving plunger 310 while preventing a frictional interface at the center magnetic pole face interface where it would otherwise form a friction brake preventing movement. Alternatively or additionally a non-stick surface such as a Teflon® or other non-slip surface may be used to allow proper operation of the actuator 300.

The pole pieces 302 and 304 have a generally square frustum cuboid configuration with a convex face surfaces 330 and 332 and square planar base surfaces 334 and 336. The square planar base surfaces 334 and 336 correspond generally in shape with the square planar face surfaces of the magnets 306 and 308. The square frustum cuboid configuration of the pole pieces 302 and 304 acts to concentrate magnetic flux of the magnets 306 and 308 about the plunger 310. The pole pieces may be constructed from any suitable magnetic flux concentrating material. Suitable materials will have high magnetic permeability and low power loss. These materials include, for example, ferrous metals and their alloys in laminate, homogenous, matrix or any other suitable form.

As is appreciated, the actuator 300 utilizes inexpensive flat magnets 306 and 308 to avoid difficulties of using radially charged magnets and gains the freedom of choosing from a wider range of magnet area, length and pole face area than the existing direct magnet face allows.

Actuator 300 uses a fully encompassing center pole area 340 which reduces losses incurred by other approaches. By surrounding a high percentage of the periphery of the moving component, the operator/plunger 310 the pole piece(s) 302 and 304 reduce the losses due to leakage and avoid the limitations of area to plunger face ratios A magnet area of (for instance) five square inches can be efficiently applied to three square inches of the moving part with whatever shape may be desired for the transfer of the flux.

Figure 15:
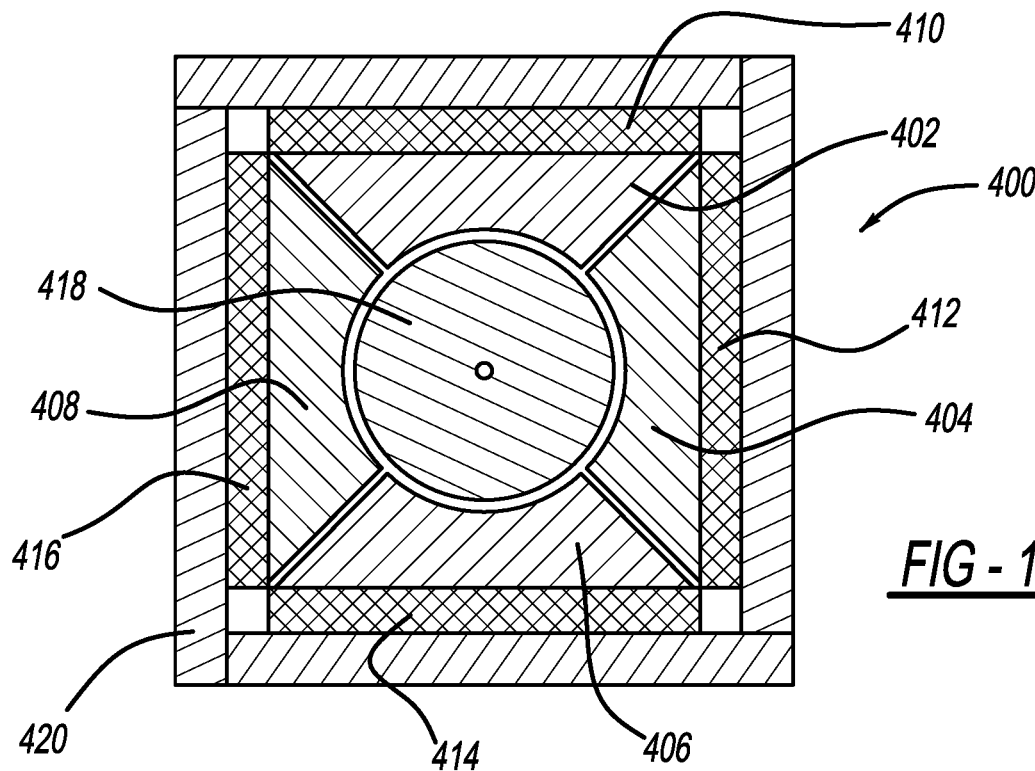
FIG. 15 is a graphic illustration of a section view of an alternate embodiment of the actuator depicted in FIG. 9.

Virtually any number of pole pieces may be used. FIGS. 9-14 illustrate structures using two pole pieces, pole pieces 302 and 304. FIG. 15 illustrates an actuator 400 that utilizes four pole pieces 402, 404, 406 and 408 coupling magnets 410, 412, 414 and 416 acting on an operator 418. The four pole pieces 402, 404, 406 and 408, magnets 410, 412, 414 and 416 and operator 418 are retained within a bobbin 420 for coils (not depicted).

Position Detection

The actuator 172 used in the recloser 100 and the actuator 300, a particular embodiment of an actuator that may be used in the application provided by the actuator 172, has two stable positions. In operation, it may become necessary to determine the position of the actuator. By extension, in the recloser 100, the position of the actuator 172 corresponds to the make or break position of the moving contact of the vacuum interrupter 152. One solution is to provide a sensor that senses actuator position. This solution adds cost and complexity. It would be preferable to determine the position of the actuator without adding a sensor or other device.

In the embodiments of the actuators described herein, and in connection with other similarly constructed actuators, two coils are used to drive the actuator between its two stable positions. For example, in the actuator 172, two coils are used to drive the actuator between the make and break contact vacuum interrupter 152 contact positions and in the actuator 300, two coils 312 and 316 are used to drive the actuator between its two stable positions.

Figure 16:
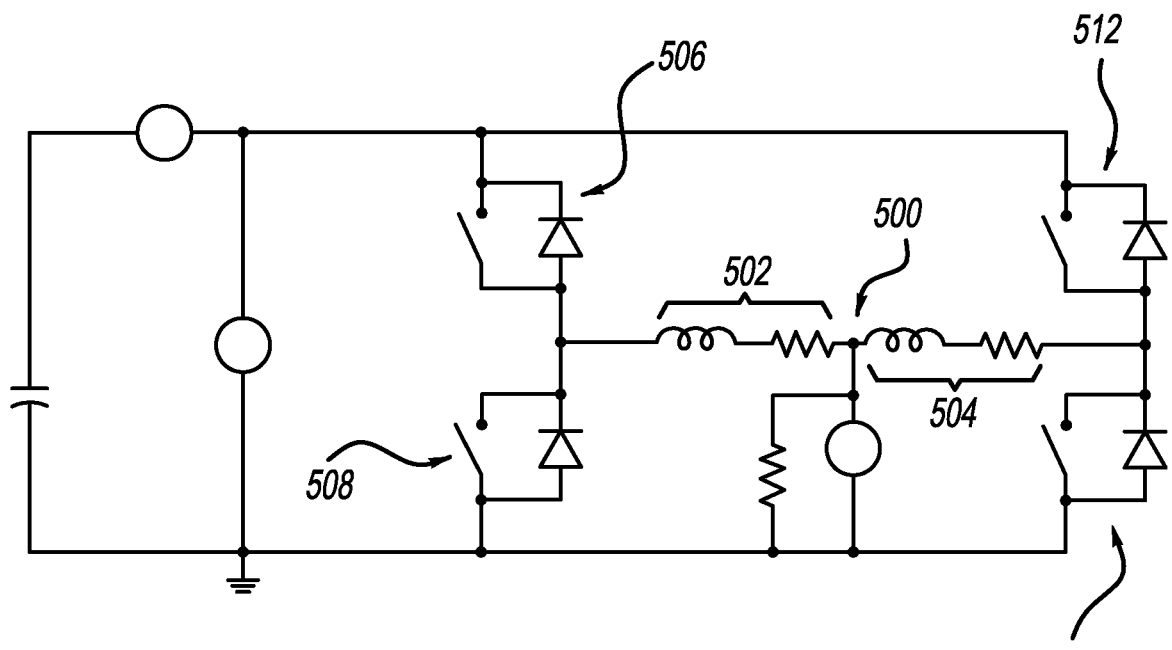
FIG. 16 is a circuit to determine the position of an actuator such as the actuator depicted in FIG. 9.

FIG. 16 provides a circuit schematic of a two coil, two position bi-stable actuator. A tap 500 is provided between first coil 502 and second coil 504 (inherent resistance also being represented). A pull down resistor is coupled at tap 500. Switch structures 506, 508, 510 and 512 allow for selectively energizing coils 502 and 504 to operate the actuator. The switches 506, 508, 510 and 512 also allow for selectively pulsing the coils 502 and 504 as described to determine position of an operator of the actuator. Voltage sensing is provided at tap 500, and voltage and current sensing is provided as applied to the actuator, i.e., the coils. Circuit capacitance is also represented in the figure.

To determine operator position, a short voltage pulse (or current pulse) is applied to the coils 502 and 504. The relative coil response shows which coil has the open gap, and hence the position of the operator.

As depicted in FIG. 16, the two series connected coils 502 and 504 are of equal coil construction. A short pulse of coil power is applied and the center tap between the coils is sensed for relative voltage. The coil with the higher voltage drop has the closed magnetic gap. Of course the coils may be of different design, e.g., different numbers of or types of windings. With such coils it is a matter of calibrating to determine the indicative voltage drops.

One example of the ways to perform the position check is to apply the coil power for ¼ millisecond while measuring the relative voltage at the center tap 500 between the series coils 502 and 504. The coil (502 or 504) with the closed gap will have a voltage greater than ½ of the applied voltage. The short time during which voltage or current is applied to the coils 502 and 504 is below the minimum mechanical response time to affect operation. The coil polarity may also be chosen to drive the actuator into its existing position, i.e., close a closed actuator or open an open actuator. The existing actuator position may be based on either the last measured position, or last open or close command. To virtually eliminate the possibility that the actuator will change state, the pulse duration is to be a very short percentage of the pulse time required to release the actuator. For example, a ¼ millisecond pulse could be used when the minimum pulse time needed to reduce the holding force to a release level is greater than 5 milliseconds. For this example less than 5% of the release pulse duration.

In the recloser 100, a three wire connector 240 couples the actuator 172, i.e., the two coils and the center tap, to the controller 186 for operating the device. The controller 186 is programmed to provide the various operating sequences such as fault trip, reclose, fault trip, drop out; one trip to drop out; operations count, vacuum interrupter end-of-service-life determination, and the like. The various operating modes are selected by manipulation of the arm 130 and the magnetic switch 191. Additionally, device operating mode, status and the like may be indicated on the display 198.

Hence, manipulation of the arm 130 may cause the controller 186 to display in scroll fashion various device information to the display or manipulation of the arm 130 may allow selection of displayed information. Additional manipulation of the arm 130 may allow setting or modification of device operating parameters. For example, the device may be set to operate in standard reclose mode (1 or more reclose attempts before sectionalizing), sectionalize mode (sectionalize on first fault indication), fault withstand mode, and the like.

A fault withstand mode may be invoked when the recloser 100 detects fault current in excess of the interrupting rating capability of the device. In this situation, the recloser 100 may maintain its state, i.e., the device remains in a closed state until an indication that other protective devices, e.g., an upstream breaker has operated. Upon detecting that an upstream device has operated, e.g., by detecting loss of voltage, to cause the recloser 100, to dropout during this interval. Alternatively, the device may be set to fault count, i.e., to determine that a selectable/settable number of excess fault current situations have occurred and then to dropout during a next suitable open interval. Detection of fault current at or below the current interrupting rating of the recloser 100 allows it to operate in accordance with its current operating settings.

We claim:

1. A device for interrupting the flow of electricity in a circuit, the device being configured for mounting in a cutout coupled to the circuit, the cutout including a spring contact and a hinge contact, the device comprising:
   a housing for the device, the housing defining an interior and an exterior;
   a post contact and a trunnion contact disposed on the exterior, the trunnion contact configured to be received within the hinge contact to permit the device to be rotated relative to the cutout, the device being further configured to be secured in the cutout and electrically coupled to the circuit by engagement of the post contact with the spring contact and the trunnion contact with the hinge contact;

a dropout out mechanism disposed in the interior, a portion of the trunnion extends into the interior and is coupled to the dropout mechanism;

a weather-tight seal disposed about the portion and engaged with the housing to seal the interior from the exterior about the trunnion; and the dropout mechanism having a first position corresponding to a first position of the post contact relative to the trunnion contact such that the device remains secured within the cutout by engagement of the post contact with the spring contact and the trunnion contact with the hinge contact and a second position corresponding to a second position of the post contact relative to the trunnion contact such that the post contact is released from the spring contact and the device is permitted to rotate about the trunnion contact within the hinge contact.

2. The device of claim 1, wherein the dropout mechanism is configured to permit translation of the housing relative to the trunnion such that the post contact and the trunnion contact are in the second position.

3. The device of claim 1, wherein the dropout mechanism is configured to permit longitudinal translation of the housing relative to the trunnion such that the post contact and the trunnion contact are in the second position.

4. The device of claim 1, wherein the dropout mechanism is configured to permit articulation of the housing relative to the trunnion such that the post contact and the trunnion contact are in the second position.

5. The device of claim 1, wherein the dropout mechanism is entirely contained within the interior.

6. The device of claim 1, wherein the dropout mechanism is sealed within the interior.

7. The device of claim 1, wherein the post contact is fixed to the housing.

8. The device of claim 1, further comprising tab members disposed within the interior and engaging the portion to fix the trunnion contact relative to the housing and wherein the dropout mechanism comprises operating members and an actuator, wherein the actuator drives the operating members to release the tab members freeing the housing to move relative to the trunnion contact such that the post contact and the trunnion contact are in the second position.

9. A method of releasing a device from a cutout, the cutout including a spring contact and a hinge contact, the device including a housing for the device, the housing defining an interior and an exterior; a post contact and a trunnion contact disposed on the exterior, the trunnion contact configured to be received within the hinge contact to permit the device to be rotated relative to the cutout, the device being further configured to be secured in the cutout and electrically coupled to the circuit by engagement of the post contact with the spring contact and the trunnion contact with the hinge contact, the method comprising:

changing a relative position of the post contact and the trunnion contact from a first position to a second position to release the post contact from the spring contact; and rotating the device about the trunnion contact within the hinge contact to separate the post contact from the spring contact.

10. The method of claim 9, wherein changing a relative position of the post contact and the trunnion contact comprises moving the housing relative to trunnion.

11. The method of claim 9, wherein changing a relative position of the post contact and the trunnion contact comprises translating the housing relative to the trunnion.

12. The method of claim 9, wherein changing a relative position of the post contact and the trunnion contact comprises actuating a dropout mechanism disposed within the interior.

13. The method of claim 12 comprises sealing the dropout mechanism within the interior.

14. The method of claim 12, wherein actuating a dropout mechanism comprises releasing tabs engaged with a portion of the trunnion disposed within the interior.

\* \* \* \* \*